United States Patent
Putterman et al.

(10) Patent No.: US 12,001,919 B1
(45) Date of Patent: Jun. 4, 2024

(54) FREQUENCY SELECTIVE PHOTON DISSIPATION FOR AN ENERGY GAP PROTECTED QUBIT

(71) Applicant: Amazon Technologies, Inc., Seattle, WA (US)

(72) Inventors: Harald Esko Jakob Putterman, Malibu, CA (US); Joseph Kramer Iverson, Pasadena, CA (US); Liang Jiang, Chicago, IL (US); Fernando Brandao, Pasadena, CA (US); Kyungjoo Noh, Pasadena, CA (US); Oskar Jon Painter, Sierra Madre, CA (US); Qian Xu, Chicago, IL (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 17/364,813

(22) Filed: Jun. 30, 2021

(51) Int. Cl.
 *G06N 10/00* (2022.01)

(52) U.S. Cl.
 CPC ................... *G06N 10/00* (2019.01)

(58) Field of Classification Search
 CPC .................................... G06N 10/00
 USPC ........................................ 716/102
 See application file for complete search history.

(56) References Cited

U.S. PATENT DOCUMENTS

2018/0341874 A1 * 11/2018 Puri ................ H03F 19/00

OTHER PUBLICATIONS

F. Arute, et al., "Quantum supremacy using a programmable superconducting processor", Nature 574, pp. 505-510 (2019).
P. W. Shor, "Algorithms for quantum computation: discrete logarithms and factoring", in Proceedings 35th Annual Symposium on Foundations of Computer Science (1994), pp. 124-134.
S. Lloyd, "Universal quantum simulators", Science vol. 273, No. 5278, pp. 1073-1078, (1996).
D. Gottesman, "An Introduction to Quantum Error Correction and Fault-Tolerant Quantum Computation", Proceedings of Symposia in Applied Mathematics, arXiv e-prints , arXiv:0904.2557 (2009), arXiv:0904.2557 [quantph], pp. 1-46.
A. G. Fowler, M. Mariantoni, J. M. Martinis, and A. N. Cleland, "Surface codes: Towards practical large-scale quantum computation", © 2012 American Physical Society, Physical Review A 86, 032324 (2012), pp. 1-48.
J. Koch, et al., "Charge-insensitive qubit design derived from the cooper pair box", © 2007 American Physical Society, Physical Review A 76, 042319 (2007), pp. 1-19.
J. A. Schreier, et al., "Suppressing charge noise decoherence in superconducting charge qubits", © 2008 American Physical Society, Physical Review B 77, 180502 (2008), pp. 1-4.
L. Egan, et al., "Fault-Tolerant Operation of a Quantum Error-Correction Code", arXiv e-prints, arXiv:2009.11482 (2020), arXiv:2009.11482 [quant-ph], pp. 1-17.

(Continued)

*Primary Examiner* — Eric D Lee
(74) *Attorney, Agent, or Firm* — Alexander A. Knapp; Kowert, Hood, Munyon, Rankin & Goetzel, P.C.

(57) ABSTRACT

Selective frequency dissipation is implemented that enables cooling of energy gap protected qubits such that excited energy states resulting from heating or other undesired processes are returned to a lower excited energy state or a ground state manifold, thus reducing the probability of errors. Also, the selective frequency dissipation inhibits leakage from the energy gap protected qubits when in the ground state.

20 Claims, 6 Drawing Sheets

(56) References Cited

OTHER PUBLICATIONS

P. T. Cochrane, G. J. Milburn, and W. J. Munro, "Macroscopically distinct quantum-superposition states as a bosonic code for amplitude damping", Physical Review A, vol. 59, No. 4, pp. 2631-2634 (1999).

H. Jeong and M. S. Kim, "Efficient quantum computation using coherent states", © 2002 The American Physical Society, Physical Review A, vol. 65, 042305 (2002), pp. 1-6.

M. Mirrahimi, et al., "Dynamically protected cat-qubits: a new paradigm for universal quantum computation", © 2014 IOP Publishing Ltd and Deutsche Physikalische Gesellschaft, New Journal of Physics 16, 045014 (2014) pp. 1-31.

S. Puri, S. Boutin, and A. Blais, "Engineering the quantum states of light in a kerr-nonlinear resonator by two-photon driving", npj Quantum Information 3, Article 18 (2017), pp. 1-7.

J. Guillaud and M. Mirrahimi, Repetition Cat Qubits for Fault-Tolerant Quantum Computation, Physical Review X 9, 041053 (2019), arXiv e-print arXiv:1904.09474, pp. 1-23.

S. Puri, et al, "Bias-preserving gates with stabilized cat qubits", Science Advances 6, 10.1126/sciadv.aay5901 (2020), pp. 1-15.

D. K. Tuckett, S. D. Bartlett, and S. T. Flammia, "Ultrahigh error threshold for surface codes with biased noise", © 2018 American Physical Society, Physical Review Letters 120, 050505 (2018), pp. 1-5.

D. K. Tuckett, et al, "Tailoring surface codes for-highly biased noise", Chapter 3, Physical Review X 9, 041031 (2019), pp. 53-251.

D. K. Tuckett, et al., "Fault-tolerant thresholds for the surface code in excess of 5% under biased noise", Pphysical Review Letters 124, 130501 (2020), arXiv e-print arXiv:1907.02554, pp. 1-10.

C. Chamberland, et al., "Building a fault-tolerant quantum computer using concatenated cat codes", arXiv e-prints, arXiv:2012.04108 (2020), arXiv:2012.04108 [quant-ph], pp. 1-118.

J. Guillaud and M. Mirrahimi, "Error rates and resource overheads of repetition cat qubits", Physical Review A 103, 042413 (2021), arXiv e-print arXiv:2009.10756, pp. 1-17.

J. P. Bonilla Ataides, et al, "The XZZX Surface Code", Nature Communications 12, 2172 (2021), arXiv eprint: arXiv:2009.07851, pp. 1-16.

A. S. Darmawan, et al., "Practical quantum error correctio with the XZZX code and Kerr-cat qubits", arXiv e-prints, arXiv:2104.09539 (2021), arXiv:2104.09539 [quant-ph], pp. 1-21.

Z. Leghtas, et al., "Confining the state of light to a quantum manifold by engineered two-photon loss", Science vol. 347, pp. 853-857 (Feb. 20, 2015).

S. Touzard, et al., "Coherent Oscillations inside a Quantum Manifold Stabilized by Dissipation", Published by the American Physical Society, Physical Review X 8, 021005 (2018), pp. 1-7.

R. Lescanne, et al., "Exponential suppression of bit-flips in a qubit encoded in an oscillator", Nature Physics 16, 509 (2020), arXiv e-print: arXiv:1907.11729v1 [quant-ph] Jul. 26, 2019, pp. 1-18.

A. Grimm, et al., "The Kerr-Cat Qubit: Stabilization, Readout, and Gates", Nature 584, 205 (2020), arXiv e-print: arXiv:1907.12131v2 [quant-ph] Aug. 18, 2020, pp. 1-24.

Q. Xu, J. K. Iverson, F. G. S. L. Brandao, and L. Jiang, "Engineering fast bias-preserving gates on stabilized cat qubits", arXiv e-prints, arXiv:2105.13908 (2021), arXiv:2105.13908 [quant-ph], pp. 1-18.

S. Puri, et al., "Stabilized Cat in Driven Nonlinear Cavity: A Fault-Tolerant Error Syndrome Detector", Physical Review X 9, 041009 (2019), arXiv e-print: arXiv:1807.09334v1 [quant-ph], pp. 1-22.

V. S. Ferreira, et al., "Collapse and Revival of an Artificial Atom Coupled to a Structured Photonic Reservoir", arXiv e-prints, arXiv:2001.03240 (2020), arXiv:2001.03240 [quant-ph], pp. 1-19.

F. Reiter and A. S. Sørensen, "Effective operator formalism for open quantum systems", Physical Review A 85, 032111 (2012), arXiv e-print: arXiv:1112.2806v2 [quant-ph], pp. 1-11.

Fernando G.S.L. et al, "Colored Kerr cat qubits", dated Jun. 29, 2021, pp. 1-13.

U.S. Appl. No. 17/709,230, filed Mar. 30, 2022, Putterman, et al.

* cited by examiner

FREQUENCY SELECTIVE PHOTON DISSIPATION FOR AN ENERGY GAP PROTECTED QUBIT

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g. the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

For some types of quantum computations, such as fault tolerant computation of large scale quantum algorithms, overhead costs for performing such quantum computations may be high. For example for types of quantum gates that are not naturally fault tolerant, the quantum gates may be encoded in error correcting code, such as a surface code. However this may add to the overhead number of qubits required to implement the large scale quantum algorithms. Also, performing successive quantum gates, measurement of quantum circuits, etc. may introduce probabilities of errors in the quantum circuits and/or measured results of the quantum circuits.

Figure 1:
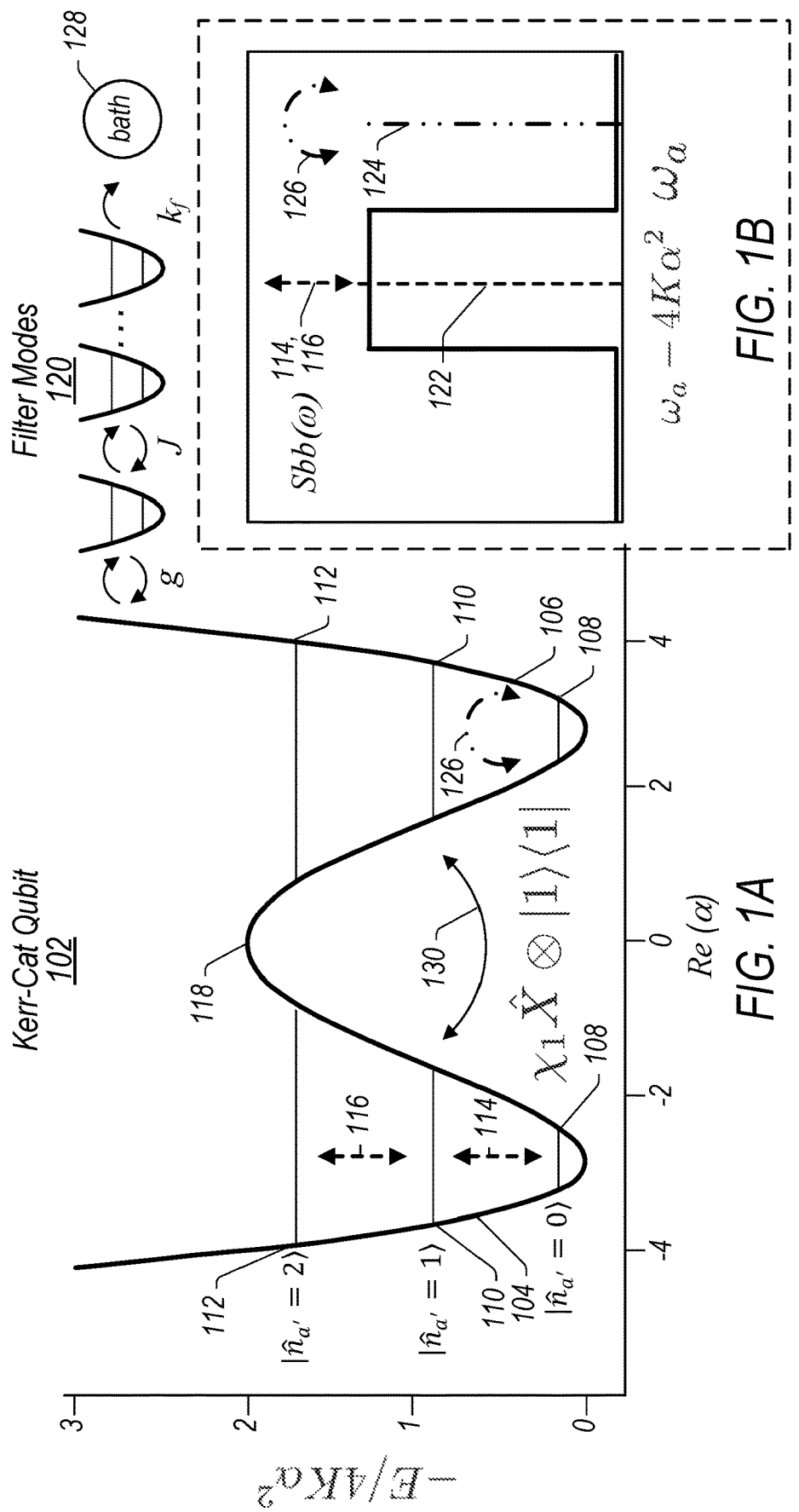
FIG. 1A illustrates a graph showing energy (vertical axis) versus oscillator position (horizontal axis) for an oscillator that implements a Kerr cat qubit, wherein the oscillator implementing the Kerr cat qubit is coupled to a series of filter modes coupled to a bath, and wherein the series of filter modes coupled to the bath implement frequency selective photon dissipation from the Kerr cat qubit, according to some embodiments.
FIG. 1B illustrates a graph corresponding to the system shown in FIG. 1A wherein the graph shows frequencies (horizontal axis) and energy (vertical axis) at which photon dissipation is permitted and restricted from the Kerr cat qubit due to a filtering effect of the series of filter modes that implement frequency selective photon dissipation from the Kerr cat qubit, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing frequency selective dissipation from an energy gap protected qubit, such as a Kerr-cat qubit, and/or implementing dynamical decoupling of the wells of an energy gap protected qubit.

Quantum computers have been shown to provide quantum speedup for certain sampling problems. However, currently available quantum computers are still too noisy to tackle problems of significant practical importance such as the factorization of a large integer and the simulation of the real-time dynamics of a large quantum system. Hence, quantum error correction and fault-tolerant techniques are essential to make quantum computers sufficiently reliable. One approach to building a fault-tolerant quantum computer is to use a surface code with two-level qubits such as transmons or trapped-ion qubits.

However, in some embodiments as described herein, energy gap protected qubits may be used as an alternative to bare two-level qubits. Unlike bare two-level qubits, at least some energy gap protected qubits, such as Kerr cat qubits are redundantly encoded in an oscillator mode and have two coherent state components $|+\alpha\rangle$ as their approximate computational basis states. For example, quantum information is redundantly stored as $|+\alpha\rangle$ and $|-\alpha\rangle$. Thus, error detection and/or correction can be performed using the two coherent states that approximate the computational basis states. In particular, since the two coherent states with $|\alpha^2\rangle \gg 1$ are well separated in the phase space of an oscillator mode, the bit-flip error rate of the energy gap protected qubits can be significantly suppressed by stabilizing the cat qubits to the $|+\alpha\rangle$ manifold. Such a stabilization can be physically realized either via an engineered two-photon dissipation or via an engineered Kerr nonlinearity. In the former case, the cat qubits are called dissipative cat qubits and in the latter case, the cat qubits are referred to as Kerr cat qubits. Note that while various examples are described herein in terms of Kerr cat qubits, in some embodiments frequency selective dissipation may be implemented using other types of energy gap protected qubits, or even qudits that store more than two levels of quantum information. Also, in some embodiments, dynamical decoupling of wells of an energy gap protected qubit may be performed using a Kerr cat qubit or other types of energy gap protected qubits.

Since the bit-flip error rates of the energy gap protected qubits are suppressed, noise of the energy gap protected qubits may be biased towards phase-flip errors. Additionally, the noise bias of the energy gap protected qubits can be maintained during the entire execution of a CNOT gate. Such a noise bias and bias-preserving CNOT gate can greatly simplify an error-correction strategy for the energy gap protected qubits. This is because the error correction can be focused on correcting the dominant phase-flip errors while worrying less about the bit-flip errors. For instance, instead of using a square surface code to provide tolerance for a significant number of bit-flip errors, a repetition code, a thin rectangular surface code, or an XZZX surface code may be used instead. This use of a more simple code that requires fewer qubits may reduce hardware resource overhead costs for achieving a sufficiently low logical error rate.

FIG. 1A illustrates a graph showing energy (vertical axis) versus oscillator position (horizontal axis) for an oscillator that implements a Kerr cat qubit, wherein the oscillator implementing the Kerr cat qubit is coupled to a series of filter modes coupled to a bath, and wherein the series of filter modes coupled to the bath implement frequency selective photon dissipation from the Kerr cat qubit, according to some embodiments.

In at least some energy gap protected qubits, such as shown in FIG. 1A, there are two wells, wherein a bottom of each of the wells is a local energy minima. Heating or other spurious interactions may cause excitation above a ground state, for example to a first excited state or a second excited state, etc. For example, FIG. 1A shows a first well (104) and a second well (106) that are separated in phase space. Also, there is an energy gap (114) between degenerate ground state manifolds (108) and the first excited states (110), and another energy gap (116) between the first excited states (110) and the second excited states (112). However, if energy is allowed to hop between the wells, such as between well 104 and 106, or vice versa, this may cause a bit flip error. In some embodiments, degenerate ground state manifolds 108 may be approximately degenerate ground states. For example, the energy of an approximate degenerate ground state and a first excited state (e.g. first excited states 110) may be relatively close to one another such that there is degeneration from one state to another.

In some embodiments, a first excited state 110 may function as an intermediate excited energy state between the ground state manifold 108 and the second excited state 112.

The portion of the oscillation mode rising vertically between the wells (e.g. hump 118) is an energy barrier that prevents photons from "tunneling" between wells 104 and 106. However, when the cat states are in an excited state such as the first excited state (110) or the second excited state (112), the energy barrier to be overcome in order for a photon to hop between wells is smaller. Thus, selectively dissipating photons at frequencies at which an excited state is reduced from the second excited state (112) to the first excited state (110), or selectively dissipating photons at frequencies at which an excited state is reduced from the first excited state (110) to the degenerate ground state manifold (108), may reduce bit flip errors. However, allowing leakage of photons from one of the degenerate ground state manifolds 108 may result in phase flip errors. Thus, the harmonic filter modes 120 and associated couplings are designed to selectively permit photon dissipation at the frequencies in which the excited state is reduced from the second excited state (112) to the first excited state (110) or the frequency at which the excited state is reduced from the first excited state (110) to the degenerate ground state manifold (108), but suppress photon dissipation at frequencies corresponding to leakage from the degenerate ground state manifold (108).

FIG. 1B illustrates a graph corresponding to the system shown in FIG. 1A wherein the graph shows frequencies (horizontal axis) and energy (vertical axis) at which photon dissipation is permitted and restricted from the Kerr cat qubit due to a filtering effect of the series of filter modes that implement frequency selective photon loss from the Kerr cat qubit, according to some embodiments.

For example, FIG. 1B shows a graph wherein the dotted line 122 represents a frequency at which excitation is reduced from the second excited state (112) to the first excited state (110) and/or is reduced from the first excited state (110) to the degenerate ground state manifold (108). Also the dashed and dotted line 124 represents a frequency corresponding to leakage (126) from the degenerate ground state manifolds that is suppressed by the filter modes 120.

It is noted that FIG. 1B shows a bandpass filter centered around the frequencies 122 and suppressing frequency 124. However, in some embodiments other types of filter configurations may be used, such as a low pass filter that allows frequencies 122 to pass and suppresses frequencies 124. It is also noted that the energy gap protected qubit (such as a Kerr cat qubit) has a property such that the leakage phenomena 126 and the reduction in excitation state to a ground state (e.g. 114, 116) occur at different frequencies. In contrast in a bare two-level cat qubit the leakage phenomena 126 and the reduction in excitation state to a ground state (114, 116) occur at a same frequency thus it is impossible to filter out one but not the other based on frequency. However, an energy gap protected qubit, such as a Kerr cat qubit, enables such filtering due to the offsets in frequencies.

Additionally, Kerr cat qubits are much less susceptible to non-adiabatic gate errors than dissipative cat qubits. Hence, Kerr cat qubits can achieve a lower Z error rate for the CNOT. However, as discussed above, due to the absence of any dissipative stabilization mechanism, Kerr cat qubits are not robust against heating which causes leakage outside the code space. Such a leakage can then cause bit-flip (or X) errors, leading to the breakdown of the noise bias of the Kerr cat qubits. Thus, to realize the full potential of Kerr cat qubits, it is important to counteract the leakage caused by heating. For example, by implementing frequency selective photon dissipation via harmonic filter modes 120 coupled to bath 128. For example, by engineering the bath spectrum with multiple filter modes, the excited levels of the Kerr cat qubit are cooled back to the ground state but phase-flip errors are not induced on the logical information.

Example System Arrangements

In some embodiments, a system that implements frequency selective dissipation includes a resonator and associated drive that implements an energy gap protected qubit, such as a Kerr cat qubit, and also implements filter modes, as discussed above.

Figure 2:
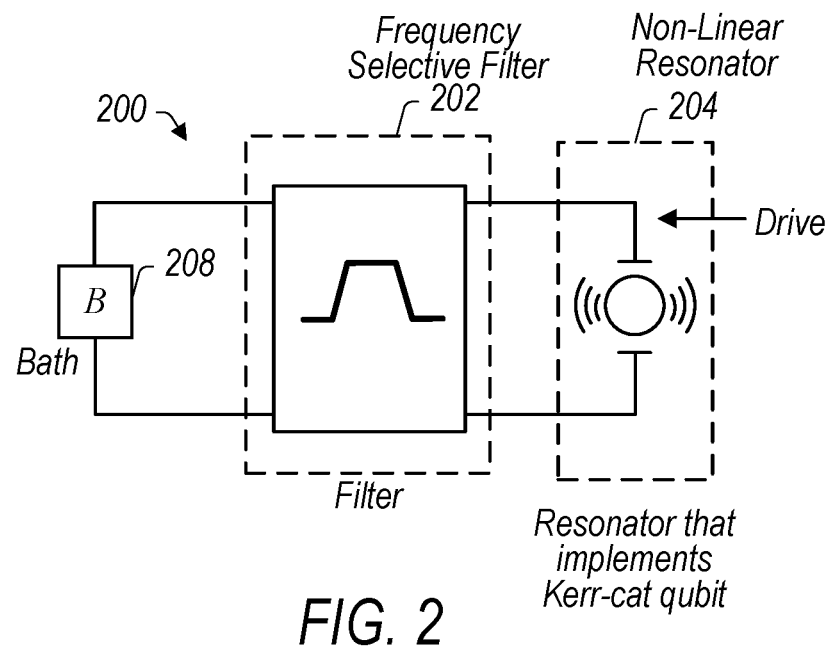
FIG. 2 illustrates an example system configuration with passive frequency selective photon dissipation (e.g. single photon dissipation), according to some embodiments.

FIG. 2 illustrates an example system configuration with passive frequency selective photon dissipation (e.g. single photon dissipation), according to some embodiments.

System 200 includes a non-linear resonator 204 coupled with a frequency selective filter 202. Also, the frequency selective filter 202 is coupled to a bath 208. In some embodiments, passive filtering may be employed, wherein the frequency selective filter 202 is continually applied and is not actively switched "on" or "off." However, in other embodiments, frequency selective filter 202 may be implemented in a switchable way wherein the filter can be switched "on" or "off." In some embodiments, a drive of the non-linear resonator applies a Kerr non-linearity to the resonator to stabilize a quantum state of the non-linear resonator, such as cat states of a Kerr-cat qubit.

Figure 3:
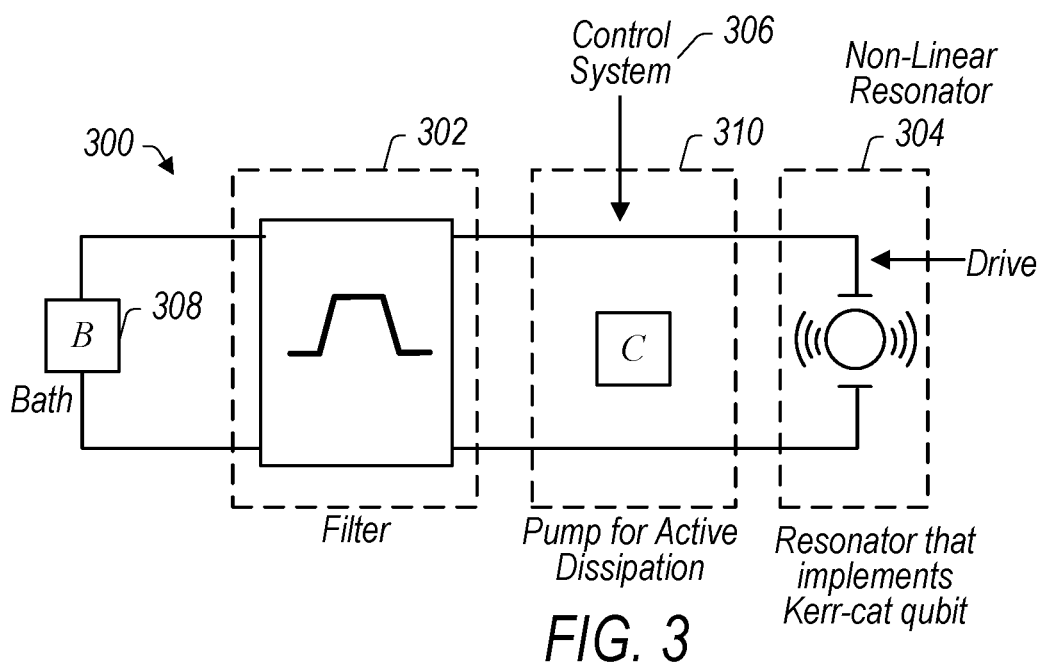
FIG. 3 illustrates an example system configuration with active frequency selective photon dissipation (e.g. two-photon dissipation), according to some embodiments.

FIG. 3 illustrates an example system configuration with active frequency selective photon dissipation (e.g. two-photon dissipation), according to some embodiments.

In some embodiments, an active filtering mechanism may be used, wherein a control system can turn the filtering "on" and "off." For example, system 300 includes pump 310 and associated control system 306. Also, in a similar manner to system 200, system 300 includes a resonator 304 coupled with a drive that implements a Kerr-non linearity or other energy gap protected qubit. Also, resonator 304 is coupled via pump 310 to filter 302 that is coupled to bath 308.

Frequency Selective Photon Dissipation

Shifted-Fock basis is useful for understanding various aspects of energy gap protected qubits. The shifted-Fock basis comprises shifted Fock states $\hat{D}(\pm\alpha)|\hat{n}=n\rangle$ with $n \in \{0, 1, \ldots, d_{max}-1\}$, where is the cut off dimension in the shifted-Fock basis. In the shifted-Fock basis for a cat qubit with a cutoff dimension $d_{max}$, the annihilation operator has the size $2d_{max} \times 2d_{max}$ and is given by $$\hat{a} = \hat{Z} \otimes (\hat{a}' + \alpha) + \mathcal{O}(e^{-2|\alpha|^2})$$

Here, $\hat{Z}$ is the 2×2 Pauli Z operator acting on the qubit sector, and $\hat{a}'$ is the truncated annihilation operator of size $d_{max} \times d_{max}$ acting on the oscillator sector. The qubit sector describes the logical information encoded in an energy gap protected qubit and the oscillator sector describes how much the energy gap protected qubit is excited from the ground state manifold. Note that a convention is used where the complementary basis states of a cat qubit are given by the even and odd cat states, e.g., $|\pm\rangle \propto |\alpha\rangle \pm |-\alpha\rangle$. In this basis convention, single-photon loss causes phase-flip (or Z) errors to the cat qubit. This is the reason why the qubit sector of the annihilation operator a is given by $\hat{Z}$. In what follows, it is assumed that a is real.

Kerr cat qubits stabilize the cat qubit manifold by using an engineered Kerr Hamiltonian $\hat{H}_{KC} = -K(\hat{a}^{\dagger 2} - \alpha^2)(\hat{a}^2 - \alpha^2)$. The subscript KC refers to the Kerr cat. Rewriting this Hamiltonian in the shifted Fock basis yields $$\hat{H}_{KC} = -4K\alpha^2 \hat{I} \otimes \hat{a}'^\dagger \hat{a}' - \hat{I} \otimes [2K\alpha(\hat{a}'^{\dagger 2}\hat{a}' + \hat{a}'^{\dagger 2}\hat{a}'^\dagger) + K\hat{a}'^{\dagger 2}\hat{a}'^2] + \mathcal{O}(e^{-\alpha^2})$$

Thus in the limit of small excitations in the oscillator sector (e.g. $\hat{a}'^\dagger \hat{a}' \ll \alpha$), the second line in the above equation can be neglected and the Kerr cat Hamiltonian is approximately reduced to that of a harmonic oscillator with an energy spacing $-4K\alpha^2$. Such a non-zero energy gap protects Kerr cat qubits against coherent perturbations by making them off-resonant. However, some energy gap protected qubits, such as Kerr cat qubits, are not robust against some incoherent perturbations (e.g., heating) due to the absence of a dissipative stabilization mechanism.

Figure 4:
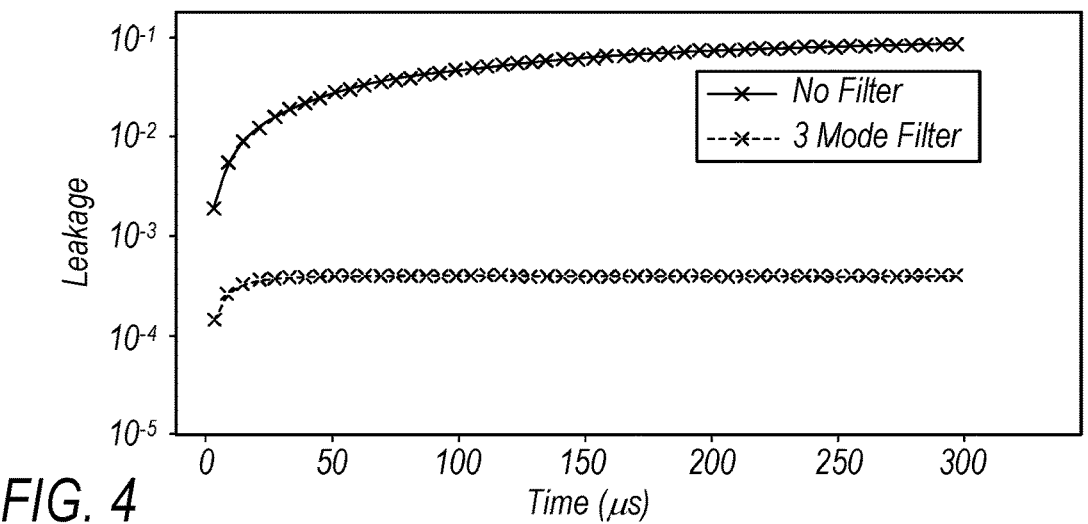
FIG. 4 is a graph illustrating leakage accumulation (for example due to heating) over time with and without added dissipation, wherein leakage corresponds to population not in the ground state manifold, according to some embodiments.

For example, heating of an oscillator can be modeled by the dissipator $K_1 n_{th} \mathcal{D}[\hat{a}^\dagger]$. From the creation operator $\hat{a}^\dagger \simeq \hat{Z} \otimes (\hat{a}'^\dagger + \alpha)$ in the shifted-Fock basis, it can be seen that the heating induces a phase flip in the Kerr cat qubits (see the $\hat{Z}$ term in the qubit sector) and importantly leakage outside the code space due to the $\hat{a}'^\dagger$ term in the oscillator sector. For example, FIG. 4 illustrates leakage accumulation (for example due to heating) over time with and without added dissipation. Also, dephasing $K_\phi \mathcal{D}[\hat{a}^\dagger \hat{a}]$ also leads to leakage since $\hat{a}^\dagger \hat{a}$ contains the $\hat{a}'^\dagger$ in the oscillator sector. However, in practical settings, dephasing is less of a concern than heating for energy gap protected qubits, such as Kerr cat qubits. For example, for Kerr cat qubits the non-zero energy gap of the Kerr cat qubit suppresses dephasing noise with a 1/f noise spectrum.

Figure 5:
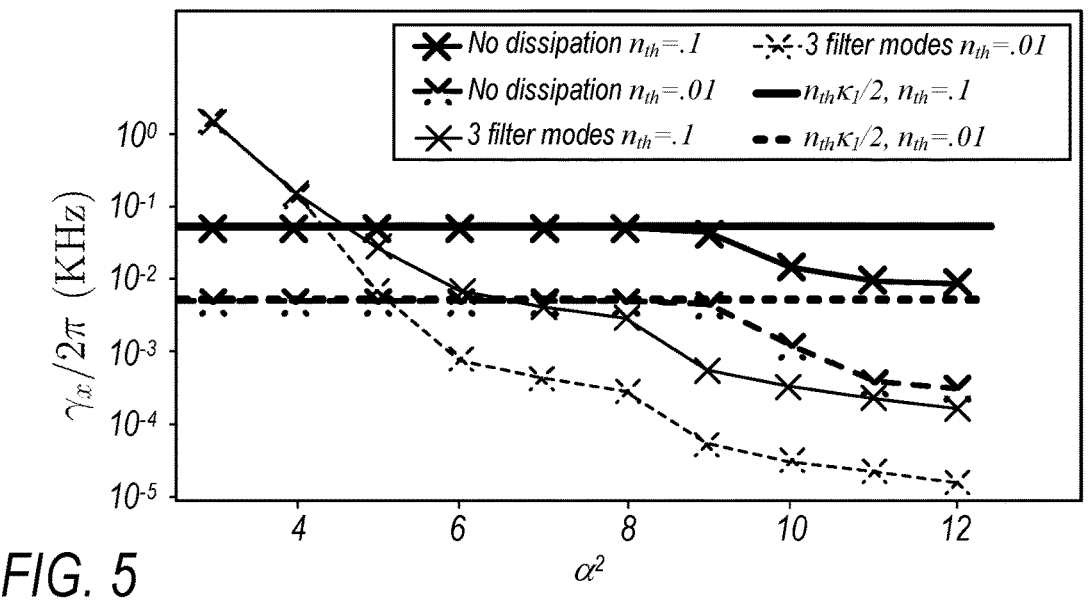
FIG. 5 is a graph illustrating a bit flip rate versus a square of state position (a) with and without added dissipation, wherein the horizontal lines are guides showing correspondence between heating to the first excited state and the corresponding respective bit flip rates, according to some embodiments.
Figure 6:
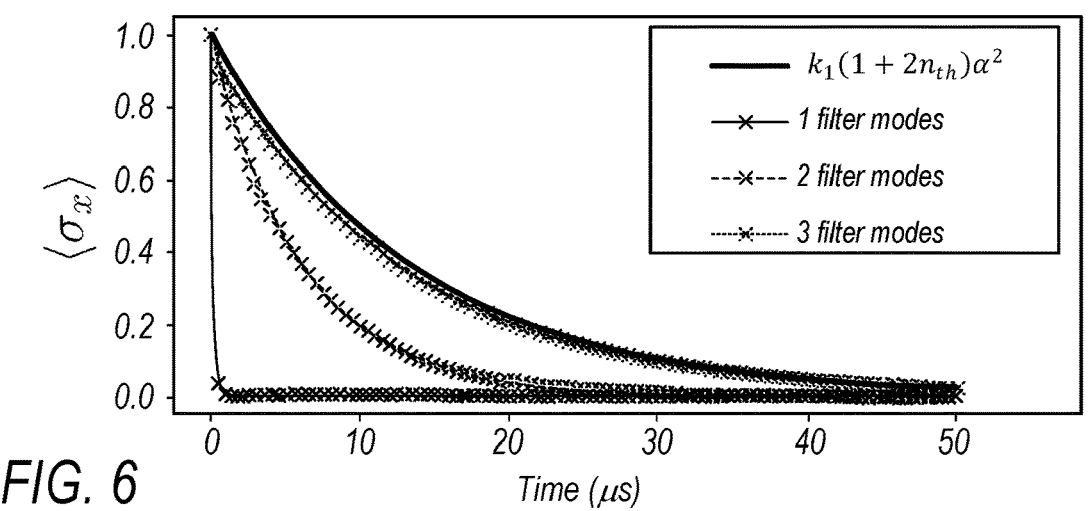
FIG. 6 is a graph illustrating behavior of a Kerr cat qubit with and without added dissipation for low values of a, according to some embodiments.

In the graphs shown in FIGS. 4, 5, and 6 a set of experimentally relevant parameters are considered for Kerr cat qubits, e.g. $K=2\pi \times 10$ MHz, $k_1 = 2\pi \times 1$ KHz (corresponding to the lifetime of $1/k_1 = 159$ μs), and thermal population $n_{th} = 0.1$. It is assumed that the lifetime $1/k$ is an order of magnitude longer than the measured lifetime of $1/k_1 = 15$ μs as would be required for fault-tolerant quantum error correction. As can be seen in FIG. 4, the bit flip rate $\gamma_X$ of a Kerr cat qubit stays essentially constant throughout the range $3 \leq \alpha^2 \leq 9$, which are most experimentally relevant.

To understand why the bit-flip error rate $\gamma_X$ of a Kerr cat qubit does not improve as $\alpha^2$ is increased up to 9 and the contributions from $\mathcal{O}(e^{-2\alpha^2})$ in the above equation are considered. In particular the terms in $\hat{H}_{KC}$ of the form $x_n \hat{X} \otimes |\hat{n}'=n\rangle \langle \hat{n}'=n|$, wherein $x_n$ can be understood to be the tunneling rate between the states $|0\rangle \otimes |\hat{n}'=\hat{n}\rangle$ and $|1\rangle \otimes |\hat{n}'=n\rangle$, for example in the tunneling 130 as shown in FIG. 1A.

Next it is shown why the bit-flip error rate $\gamma_X$ plateaus in the range of $3 \leq \alpha^2 \leq 9$. Recall that heating excites the system to the first excited state manifold (e.g. first excited state 110 shown in FIG. 1A). Here it persists for a time interval $\Delta t \sim 1/k_1$ until it decays back to the ground state manifold (e.g. degenerate ground state manifold 108 shown in FIG. 1A). During this period, if $x_1 \gg k_1$ rapid oscillations occur between the states $|0\rangle \otimes |\hat{n}'=1\rangle$ and $|1\rangle \otimes |\hat{n}'=1\rangle$. Thus in the regime, a bit-flip error happens with approximately 50% probability whenever heating creates an excitation. As a result, the bit-flip error rate is given by half the heating rate, e.g., $\gamma_X = k_1 n_{th}/2$ in the regime $x_1 \gg k_1$.

To counteract the heating and leakage described above that may lead to bit-flips, frequency selective single photon loss is provided via the filter modes and bath (e.g. harmonic filter modes 120 and bath 128 shown in FIG. 1A). Note that intrinsic, un-engineered single-photon loss $k_1 \mathcal{D}[\hat{a}]$ is harmful for energy gap protected qubits, such as Kerr cat qubits as well as dissipative cat qubits. This is because the $+\alpha \hat{Z} \otimes \hat{I}$ term in the shifted-Fock basis representation of annihilation operator $\hat{a} \simeq \hat{Z} \otimes (\hat{a}' + \alpha)$ causes phase-flip (or Z) errors in the ground state manifold of an energy gap protected qubit. The other term (e.g. $\hat{Z} \otimes \hat{a}'$), however, is useful for suppressing leakage as it brings the excited states back to the code space via $\hat{a}'$.

The frequency selective single photon dissipation included in embodiments described herein, engineers the frequency spectrum of the bath (via the harmonic filter modes 120) for the extrinsic single photon loss such that beneficial decay term $\hat{Z} \otimes \hat{a}'$ is taken advantage of while filtering out the parasitic term $(+\alpha \hat{Z} \otimes \hat{I})$ from the single photon loss $\hat{a}$.

In some embodiments, a hardware efficient dissipation scheme is provided that recovers the noise bias by taking advantage of the energy-level structure of Kerr cat qubits. Specifically, frequency selective (e.g., colored) single photon loss is added to Kerr cat qubits. Such qubits may be called colored Kerr cat qubits as they are protected by a colored dissipation. By engineering the bath spectrum with multiple filter modes, the excited levels of the colored Kerr cat qubit are cooled back to the ground state manifold while avoiding phase-flip errors on the logical information.

In some embodiments, an energy gap protected qubit, such as a Kerr cat qubit, is coupled to an engineered bath through a set of harmonic filter modes, $\hat{f}_1, \ldots, \hat{f}_N$ with the same frequency $\omega_f$. For example, FIG. 1A shows harmonic filter modes 120 coupled to Kerr cat qubit 102 and bath 128. Consider the following Lindblad equation:

$$\frac{d\hat{\rho}(t)}{dt} = -i[\hat{H}, \hat{\rho}(t)] + k_1(1+n_{th})\hat{\mathcal{D}}[\hat{a}]\hat{\rho}(t) + k_1 n_{th}\hat{\mathcal{D}}[\hat{a}^\dagger]\hat{\rho}(t) + k_f \mathcal{D}[\hat{f}_N]\hat{\rho}(t)$$

where the Hamiltonian $\hat{H}$ is given by $$\hat{H} = \hat{H}_{KC} + \left[ g\hat{a}\hat{f}_1^\dagger e^{i\Delta t} + J\sum_{j=1}^{N-1} \hat{f}_j \hat{f}_{j+1}^\dagger + h.c. \right]$$

Here, $\Delta \equiv \omega_f - \omega_a$ is the detuning between the filter modes $\hat{f}_1, \ldots, \hat{f}_N$ and the storage mode $\hat{a}$ which hosts the Kerr cat qubit. Also, $$\mathcal{D}[\hat{A}]\hat{\rho} \equiv \hat{A}\hat{\rho}\hat{A}^\dagger - \frac{1}{2}\{\hat{A}^\dagger \hat{A}, \hat{\rho}\}$$

is the Lindblad dissipator. Besides having the intrinsic loss and heating processes (at a rate $k_1(1+n_{th})$ and $k_1 n_{th}$, respectively), the Kerr cat qubit loses an excitation and gives it the first filter mode at a rate g. Such an excitation is then transported to the last filter mode at a hopping rate J and eventually decays to a bath at a rate $k_f$. In particular, $k_f = 2J$ is chosen such that the filter modes act as an ideal band-pass filter (centered at the frequency $\omega_f$ and with a bandwidth 4J) in the $N \to \infty$ limit. However, as discussed above, in some embodiments, other filter arrangements may be used, such as a low pass filter, etc.

Recall that in the shifted Fock basis, the Kerr cat Hamiltonian is approximately given by $\hat{H}_{KC} \simeq -4K\alpha^2 \hat{I} \otimes \hat{a}'^\dagger \hat{a}'$. Thus, going to the rotating frame of the $\hat{a}'$ mode and using the shifted-Fock basis, the coupling term $g\hat{a}\hat{f}_1^\dagger e^{i\Delta t}$ is decomposed into $g\hat{Z} \otimes \hat{a}'\hat{f}_1^\dagger e^{i(\Delta + 4K\alpha^2)t} + g\alpha \hat{Z} \otimes \hat{f}_1^\dagger e^{i\Delta t}$. Note that the first term realizes a desired cooling effect through $\hat{a}'$ whereas the second term causes an undesired phase-flip (or Z) errors in the cat qubit manifold. Thus, by choosing $\Delta = -4K\alpha^2$ (or equivalently $\omega_f = \omega_a - 4K\alpha^2$), the desired first term is made resonant, while the undesired term is made off-resonant. Furthermore, by ensuring that the half bandwidth 2J is smaller than the detuning $|\Delta|$, the undesired second term is placed outside the filter band and therefore filtered out. On the other hand, the resonant desired term realizes an engineered cooling process $k_{1,eng}\mathcal{D}[\hat{Z} \otimes \hat{a}']$ with an effective cooling rate $k_{1,eng} = 4g^2/k_f$.

This scheme is illustrated in FIG. 1A (filter modes 120 and bath 128) as a set of harmonic filter modes with nearest neighbor hopping. The coupling to the filter mode has a strength g, and the filters have a frequency $\omega_f$, an inter-filter coupling of J, and the decay rate of the last filter mode is $k_f$. For an example toy model the following are chosen: $k_f = \Delta/5$, $J = k_f/2$, and $g = \eta J$, where $\eta = 0.2$. For simplicity the case of a Kerr cat qubit coupled to a single filter mode is considered. However, in some embodiments, multiple filter modes may be used or other types of energy gap protected qubits may be used. The evolution of the system in the rotating frame of the Kerr cat oscillator ($\hat{a}$) and the filter modes ($\hat{f}_i$) is given by $$\frac{d\hat{\rho}}{dt} = -i\left[ -K(\hat{a}^{\dagger 2} - \alpha^2)(\hat{a}^2 - \alpha^2), \hat{\rho}(t) \right] - i\left[ g\left( \hat{f}_1^\dagger \hat{a} e^{-i(\omega_a - \omega_f)t} + h.c. \right), \right.$$

$$\left. \hat{\rho}(t) \right] - i\left[ J\sum_{i=2}^{N} \left( \hat{f}_{i-1}^\dagger \hat{f}_i + h.c. \right), \hat{\rho}(t) \right] + k_f D[\hat{f}_N]\hat{\rho}(t)$$

In order, the terms are: the Hamiltonian for the Kerr cat qubit, the Hamiltonian coupling between the Kerr cat qubit and the first filter mode, the nearest neighbor hopping between filter modes, and finally the dissipation of the last filter mode into a cold bath. Transforming the Kerr cat qubit to the shifted Fock basis and then moving into the rotating frame of the â' mode, the coupling Hamiltonian becomes $g(\hat{f}_1^\dagger e^{i\omega_f t}(\hat{Z} \otimes (\hat{a}' e^{i4K\alpha^2 t} + \alpha))e^{-i\omega_a t} + h.c.)$.

In some embodiments, the filter frequency is put at $\omega_f = \omega_a - 4K\alpha^2$ such that the exchange interactions between the Kerr at excited states and the filter modes are on resonance. Also, importantly, the $+\alpha$ term which leads to phase-flip errors is placed off resonance by the gap frequency. Adiabatically eliminating the filter modes, the resulting dissipator is $$\frac{d\hat{\rho}}{dt} = \frac{4g^2}{k_f} D[\hat{Z} \otimes \hat{a}']\hat{\rho}(t).$$

To understand the induced phase flip rate the filter mode can be adiabatically eliminated and the shifted Fock mode of the Kerr cat qubit can be evaluated. This yields the dissipator $$\frac{d\hat{\rho}}{dt} \approx \frac{k_f g^2 \alpha^2 J^{2(M-1)}}{\Delta^{2M}} D[\hat{Z} \otimes \hat{I}]\hat{\rho}(t)$$

where a generalized case for M filter modes is used, and wherein the limit of $\Delta \gg g, J$ is taken. The exponential suppression of the bit-flip rate with the number of filter modes allows the induced phase-flip rate to be made much less than the intrinsic rate. This induced phase flip rate is shown numerically for varying numbers of filter modes in FIG. 6.

As discussed above, the bit-flip time of the Kerr cat qubit in the limit of $x_n \gg k$ is close to $k_{n=n,\uparrow}$. The effect of the frequency selective single photon loss with a rate $k_{n,cool}$ is to heavily modify the lifetimes of the excited states. With this change, the lowest excited state with coupling $x_n \sim k_{cool}$ will be pushed higher leading to a lower error rate.

In some embodiments, the choice of the filter may not be a bandpass filter centered near the gap frequency, as described above. For example, in some embodiments a wider bandpass filter with the Kerr cat near the edge of the passband or a low pass filter may be used and may allow for a higher dissipation rate. In some embodiments, filters may be implemented experimentally using quantum metamaterials.

In addition to suppressing leakage during idle operation, the frequency selective dissipation mitigates the effects of off resonant terms which cause leakage between the wells (e.g. leakage 130 shown in FIG. 1A) and non-adiabatic gate errors. Consider for example the case of the $\hat{Z}$ gate which is implemented using the Hamiltonian $\hat{H}_z = \epsilon(\hat{a}' + \hat{a})$. Transforming to the shifted Fock basis and going into the rotating frame the Hamiltonian for the gate is $\hat{H}_z = 2i\epsilon\alpha\hat{Z} \otimes \hat{I} + \epsilon\hat{Z} \otimes (\hat{b}^\dagger e^{i\Delta t} + \hat{b} e^{-i\Delta t})$. It is pointed out that the second term that would induce leakage is off resonant by the gap frequency. This is a generally useful property of Kerr cat qubits allowing for much faster gates but is specifically exploited in the context of filtering. Since the drive in the shifted Fock basis is off resonant from the gap frequency it can be strongly suppressed by the presence of the filter.

In order to see this effect, consider a more general Hamiltonian than just the $\hat{Z}$ gate since to the leading order the adiabatic elimination gives 0 Z error for Z gate. This is because any excitation that is accompanied by a Z error will be corrected when the excitation is brought down by the engineered single photon loss. This feature of the engineered single photon loss is also useful for very short gates where non-adiabatic errors become large.

To understand the effects of the filtering on non-adiabatic gates, consider the Hamiltonian $\hat{H} = \gamma\hat{I} \otimes (\hat{b}^\dagger e^{i\Delta t} + \hat{b} e^{-i\Delta t})$. In principle such a drive combined with the engineered single photon loss would lead to errors in the system as excitations are brought down with an addition $\hat{Z}$ error. Adiabatic elimination of the system can be performed with M filter modes to find that the error induced from the drive is $$\frac{d\hat{\rho}}{dt} \approx \frac{k_f g^2 \epsilon^2 J^{2(M-1)}}{\Delta^{2(M+1)}} D[\hat{Z} \otimes \hat{I}]\hat{\rho}(t)$$

In some embodiments, the suppression of off-resonant terms can be extended to other scenarios such as improving stability in physical implementations of the Kerr cat qubits.

Dynamical Decoupling

In addition to improving the bit-flip error rate through engineered loss, an energy gap protected qubit, such as the Kerr cat qubit, can also be made insensitive to leaked population by driving the energy gap protected qubit, such as the Kerr cat qubit, in a particular manner as described below. For example, the breakdown of the noise bias in Kerr cat qubits is due to couplings between the wells of the form $\hat{H} = \gamma\hat{X} \otimes |n1\rangle\langle n2|$. A linear drive can be added to the Kerr cat qubit $\hat{H} = \epsilon(\hat{a}' + \hat{a})$ that implements a Z rotation by angle $\theta$ in a time $\theta/4\alpha\epsilon$. The $\hat{Z} \otimes \hat{I}$ rotation implemented by this gate can be used to counteract the effect of the undesired coupling between the wells. In essence dynamical decoupling can be performed in the parity sector of the shifted Fock basis where the X rotation will continually refocus the Z rotation to lower the chances of a full rotation occurring. With the drive added, the rotation in the qubit sector will no longer be given by $\hat{I} \cos(xt) + i \hat{X} \sin(xt)$, but instead will be described by $$\hat{I}\cos(\gamma t) + i\left(\frac{\epsilon}{\gamma}\hat{Z} + \frac{x}{\gamma}\hat{X}\right)\sin(\gamma t)$$

where $\gamma = \sqrt{\epsilon^2 + x^2}$. Thus large $\epsilon$ has the effect of minimizing the scale of the induced rotation and suppressing the bit-flip errors.

For example, adding Z rotations (parity oscillations) to Kerr cat qubits can suppress bit-flip errors. In some circumstances, bit-flip errors in Kerr cat qubits can be dominantly attributed to leakage to excited eigenstates of the Kerr oscillator which have strong interwell couplings. These couplings are strong enough that an excitation has a large probability of leading to a bit-flip error. The coupling terms take the form $$\hat{H}_{couple} \approx \Sigma_n x_n \hat{X} \otimes |n\rangle\langle n|.$$

In the qubit sector the $\hat{X}$ indicates a coupling between the wells of the Kerr cat qubit and in the oscillator sector $|n\rangle\langle n|$ indicates the coupling is between equally excited states in both wells.

The dynamics of the Kerr cat qubit that lead to bit-flip errors are a combination of dissipative heating and unitary evolution under the interwell coupling Hamiltonian. When the Kerr cat qubit is excited to level $|n\rangle$ in the oscillator sector, the qubit sector evolution is described by the unitary $\hat{U}(t) = e^{i \cdot x_n \hat{X} t} = \hat{I} \cos(x_n t) + i \hat{X} \sin(xt)$. In a time $t = \pi/2x$ a bit flip will have occurred. If $k_n \ll x_n$ many rotations will occur and the logical Z information will be scrambled.

One way to view the addition of Z rotations is somewhat analogously to the addition of $\pi$ pulses to suppress dephasing. The Z rotations result in a constant change of the direction of the X rotations so that they interfere on themselves. In essence this performs dynamical decoupling in the qubit sector of the shifted Fock basis where the X rotation will continually refocus the Z rotation to lower the chances of a full rotation occurring. An important distinction between these two situations is that in the Kerr cat case the Z rotations suppress a Hamiltonian coupling activated by jump heating. This is to be contrasted with the addition of $\pi$ pulses to directly suppress jump dephasing.

Alternatively, it is possible to directly investigate the qubit sector dynamics of the Kerr cat qubit. With the drive added, the rotation in the qubit sector will be described by $$\hat{I}\cos(\gamma t) + i\left(\frac{\varepsilon}{\gamma}\hat{Z} + \frac{x}{\gamma}\hat{X}\right)\sin(\gamma t)$$

where $\gamma = \sqrt{\varepsilon^2 + x^2}$. In this form, it can be seen that large $\varepsilon$ has the effect of minimizing the scale of the induced rotation. With the interwell coupling off resonance the bit-flip error probability due to an excitation to level n is bounded by $(x^n/\gamma)^2$.

This suppression of the bit-flip rate is not required to be implemented with a continuous drive. More general pulses sequences of Z rotations also mitigate leakage induced bit-flips by decoupling the higher levels. For example with a sequence of delta function Z rotations with spacing of $1/\Delta$ the bit-flip error probability is upper bounded by $\sin^2(x/\Delta) \approx (x/\Delta)^2$ where the approximation holds in the limit of $x \ll \Delta$.

The dynamical decoupling can be combined with the frequency selective single photon loss (as described above in previous sections) to yield a further improved bit-flip error rate.

If one uses a continuous drive on the Kerr cat qubit to improve the bit-flip time the amount of tunneling is suppressed but the oscillation rate (now $\gamma \approx \varepsilon$) is enhanced. In this circumstance the single photon loss will add little benefit because $\varepsilon \sim k_{eng}$. Thus it is better to add Z rotations as echo pulses. In the intermittent time between the pulses the Kerr cat will benefit with the shorter lifetime of excitations. Furthermore the frequency selective loss will mitigate the non-adiabatic gate error from the physical implementation of a Z rotation.

Figure 7:
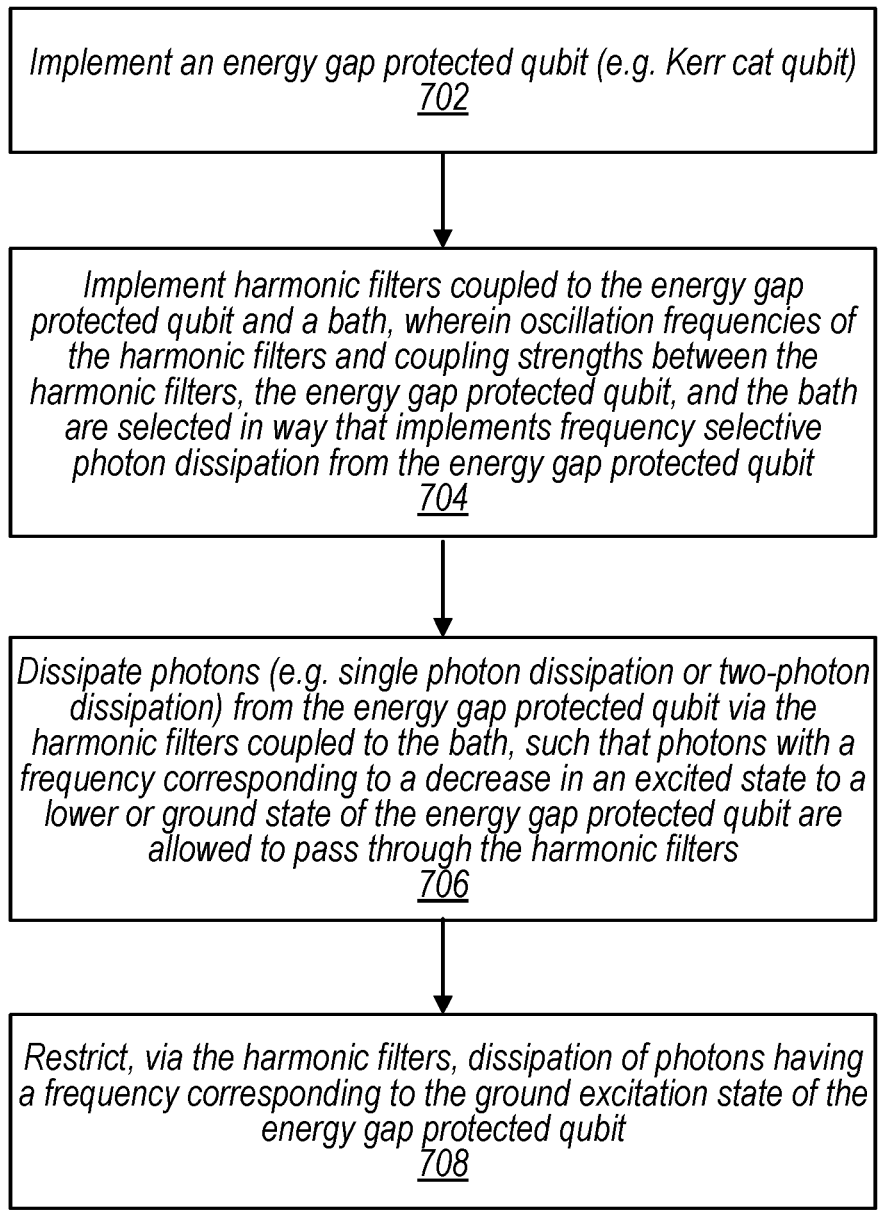
FIG. 7 is a flow diagram illustrating an example process for implementing frequency selective dissipation from an energy gap protected qubit, according to some embodiments.

FIG. 7 is a flow diagram illustrating an example process for implementing frequency selective dissipation from an energy gap protected qubit, according to some embodiments.

At 702, an energy gap protected qubit, such as a Kerr cat qubit, is implemented in a resonator, such as resonator 204 of system 200 shown in FIG. 2 or resonator 304 of system 300 shown in FIG. 3. For example, the energy gap protected qubit may have a form as shown in FIG. 1A for Kerr cat qubit 102. At 704, harmonic filters are implemented, wherein the harmonic filters are coupled to the energy gap protected qubit and a bath. To implement the harmonic filters oscillation frequencies of the harmonic filters and coupling strengths between the harmonic filters, the energy gap protected qubit, and the bath are selected in way that implements frequency selective photon dissipation from the energy gap protected cat qubit. For example, the frequencies and coupling strengths may be selected taking into account the considerations discussed above. As an example, the harmonic filters may be implemented as shown by filter 202 of system 200 shown in FIG. 2 or filter 302 of system 300 shown in FIG. 3 and may be arranged as shown in FIGS. 1A and 1B for harmonic filter modes 120.

At 706, photons are dissipated from the energy gap protected qubit via the harmonic filters coupled to the bath, such that photons with a frequency corresponding to a decrease in an excited state to a lower or degenerate ground state manifold of the energy gap protected qubit are allowed to pass through the harmonic filters.

At 708, dissipation of photons via the harmonic filters is restricted for photons having a frequency corresponding to the ground excitation state (e.g. the degenerate ground manifold) of the energy gap protected qubit. For example, leakage from the ground state is inhibited.

Figure 8:
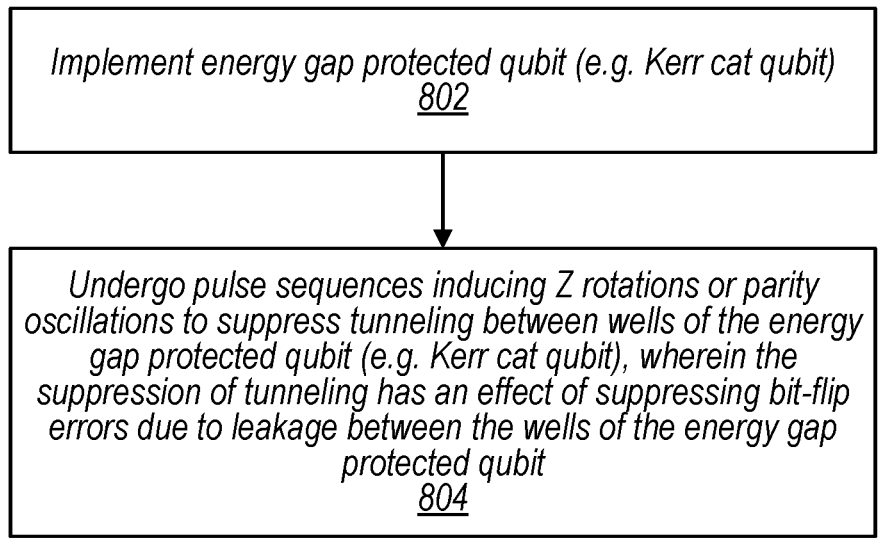
FIG. 8 is a flow diagram illustrating an example process for implementing dynamical decoupling of the wells of an energy gap protected qubit, according to some embodiments.

FIG. 8 is a flow diagram illustrating an example process for implementing dynamical decoupling of the wells of an energy gap protected qubit, according to some embodiments.

At 802, an energy gap protected qubit is implemented, in a similar manner as at 702.

At 804, in order to effectuate dynamical decoupling, pulse sequences are emitted inducing Z rotations or parity oscillations to suppress tunneling between wells of energy gap protected qubit, wherein the suppression of tunneling has an effect of suppressing bit-flip errors due to leakage between the wells of the energy gap protected qubit.

In some embodiments, dynamical decoupling and frequency selective dissipation may be implemented together or separately. For example, in some embodiments, dynamical decoupling may be implemented without necessarily requiring the filtering associated with frequency selective dissipation to be implemented. Also, in some embodiments, frequency selective dissipation may be implemented without necessarily requiring the dynamical decoupling to be implemented, e.g. without requiring the emission of the pulse frequencies described in 804.

Illustrative Computer System

Figure 9:
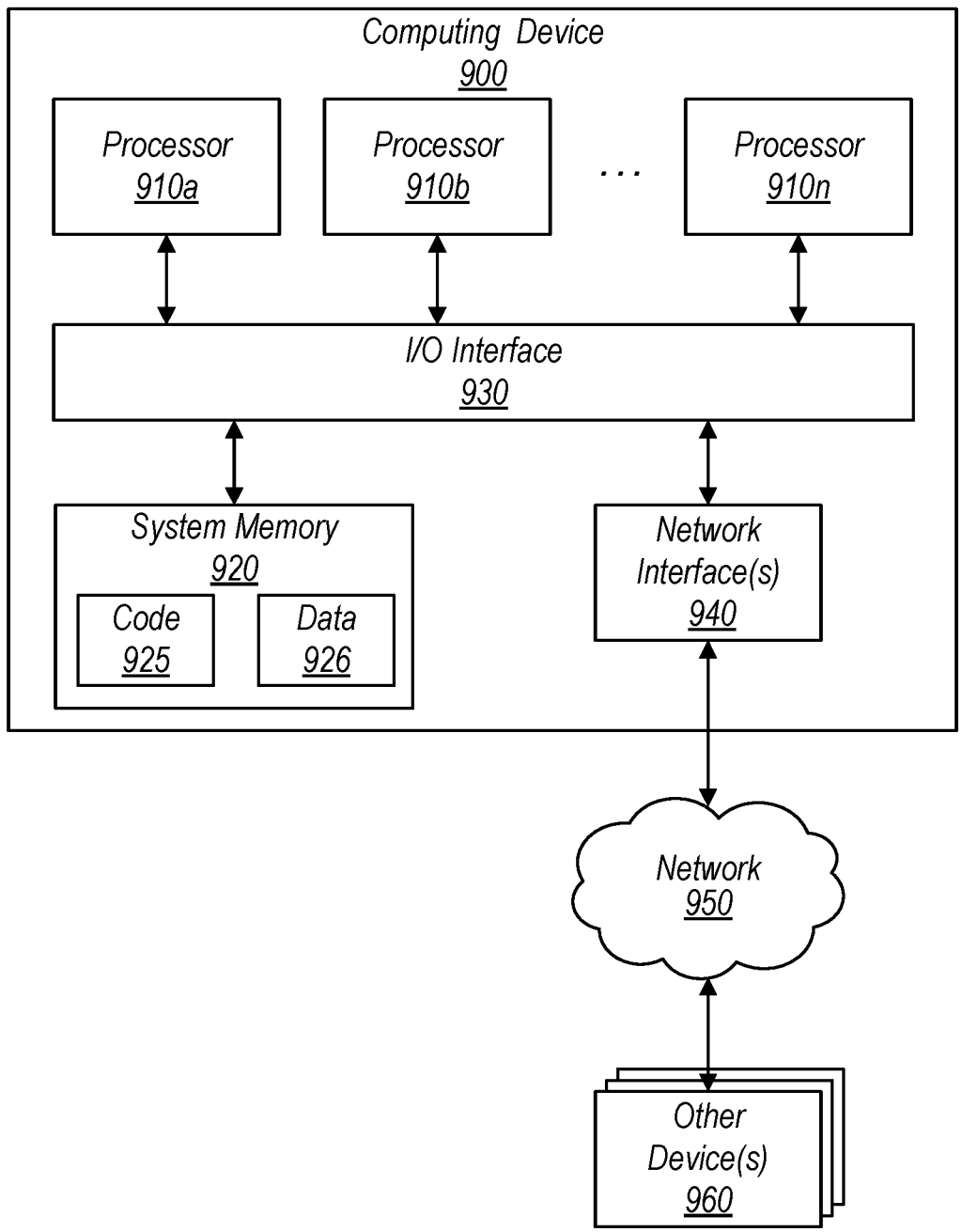
FIG. 9 is a block diagram illustrating an example classical computing device that may be used in at least some embodiments.

FIG. 9 is a block diagram illustrating an example computing device that may be used in at least some embodiments.

FIG. 9 illustrates such a general-purpose computing device 900 as may be used in any of the embodiments described herein to perform classical computing tasks, such as control for a control circuit and/or interpreting quantum measurements. In the illustrated embodiment, computing device 900 includes one or more processors 910 coupled to a system memory 920 (which may comprise both non-volatile and volatile memory modules) via an input/output (I/O) interface 930. Computing device 900 further includes a network interface 940 coupled to I/O interface 930. Classical computing functions such as edge graphing of syndrome measurement and other non-quantum operations as described herein may be performed on a classical computer system, such as computing device 900.

In various embodiments, computing device 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. In some implementations, graphics processing units (GPUs) may be used instead of, or in addition to, conventional processors.

System memory 920 may be configured to store instructions and data accessible by processor(s) 910. In at least some embodiments, the system memory 920 may comprise both volatile and non-volatile portions; in other embodiments, only volatile memory may be used. In various embodiments, the volatile portion of system memory 920 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 920 as code 925 and data 926.

In some embodiments, I/O interface 930 may be configured to coordinate I/O traffic between processor 910, system memory 920, and any peripheral devices in the device, including network interface 940 or other peripheral interfaces such as various types of persistent and/or volatile storage devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other devices 960 attached to a network or networks 950, such as other computer systems or devices. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system comprising:
   quantum hardware configured to implement:
      a mode configured to:
         stabilize an approximately degenerate ground state of a Hamiltonian in an oscillator mode for an energy gap protected qubit; and
      a decay channel for the mode, wherein:
         dissipation is permitted from the energy gap protected qubit via the decay channel at frequencies at which the system moves from a higher excited energy state to a lower energy state, wherein the lower energy state is a degenerate ground state manifold or an intermediate excited energy state; and emission of photons is restricted from the energy gap protected qubit via the decay channel at a frequency of the degenerate ground state manifold.

2. The system of claim 1, wherein the decay channel comprises:
a plurality of filter modes, wherein a first one of the filter modes is coupled to the energy gap protected qubit and another one of the filter modes is coupled to a bath configured to absorb an excitation or excitations dissipated from the energy gap protected qubit via the plurality of filter modes,
wherein one or more of:
frequencies of the filter modes,
a coupling between the first filter mode and the energy gap protected qubit, one or more respective couplings between the filter modes, or
a coupling between the other filter mode and the bath, are selected such that:
dissipation is permitted from the energy gap protected qubit via the filter modes at frequencies at which the system moves from a higher excited energy state to a lower energy state, wherein the lower energy state is a degenerate ground state manifold or an intermediate excited energy state; and
emission of photons is restricted from the energy gap protected qubit via the filter modes at the frequency of the degenerate ground state manifold.

3. The system of claim 2, wherein the filter modes and the bath are configured to implement frequency selective photon loss for the energy gap protected qubit.

4. The system of claim 1, wherein the energy gap protected qubit is a Kerr qubit.

5. The system of claim 1, wherein the energy gap protected qubit is a cat qubit.

6. The system of claim 1, wherein the energy gap protected qubit is a Kerr-cat qubit stabilized using a Kerr nonlinearity of a drive of a resonator and a two photon drive.

7. The system of claim 1, wherein the dissipation is a single photon dissipation.

8. The system of claim 2, wherein:
the energy gap protected qubit is a Kerr-cat qubit;
the dissipation is a single photon dissipation; and
the filter modes and the bath are configured to implement frequency selective single-photon loss from the Kerr-cat qubit.

9. The system of claim 8, wherein the frequency selective single photon loss mitigates heating of the Kerr-cat qubit such that excitement caused by the heating is mitigated by dissipating a photon from the Kerr-cat qubit via the filter modes such that energy states for the Kerr-cat qubit are returned to the degenerate ground state manifold.

10. The system of claim 1, further comprising a control system configured to implement active coupling of the first filter mode to the energy gap protected qubit.

11. The system of claim 10, wherein the control system is configured to turn "on" and turn "off" frequency selective photon loss from the energy gap protected qubit via the active coupling.

12. The system of claim 10, wherein the dissipation is two-photon dissipation.

13. The system of claim 1, wherein the energy gap protected qubit is a Kerr-cat qubit stabilized using a Kerr nonlinearity of a drive of a resonator, and wherein the resonator is a photonic resonator or a microwave resonator.

14. The system of claim 1, wherein the dissipation to the degenerate ground state manifold reduces a probability of occurrence of bit-flip errors.

15. The system of claim 1, wherein the restriction of emission of photons from the degenerate ground state manifold reduces a probability of occurrence of phase flip errors.

16. The system of claim 2, wherein the plurality of filter modes collectively implement a bandpass filter for dissipation from the energy gap protected qubit such that dissipation at frequencies within the band pass are permitted and dissipation at frequencies outside of the band pass are suppressed.

17. The system of claim 2, wherein the plurality of filter modes collectively implement a low pass filter for dissipation from the energy gap protected qubit such that dissipation at frequencies below a given frequency are permitted and dissipation at frequencies above the given frequency are suppressed.

18. The system of claim 1, wherein the control circuit is further configured to:
undergo pulse sequences inducing Z rotations or parity oscillations to suppress tunneling between wells of the oscillator mode, wherein the respective wells correspond to the respective cat states of the energy gap protected qubit.

19. A method comprising:
stabilizing an approximately degenerate ground state of a Hamiltonian in an oscillator mode for an energy gap protected qubit; and
dissipating photons from the energy gap protected qubit via a decay channel, wherein
dissipation is permitted from the energy gap protected qubit via the decay channel at frequencies at which the energy gap protected qubit moves from a higher excited energy state to a lower energy state, wherein the lower energy state is a degenerate ground state manifold or an intermediate excited energy state; and
emission of photons is restricted from the energy gap protected qubit via the decay channel at a frequency of the degenerate ground state manifold.

20. One or more non-transitory computer-readable media storing program instructions, usable to cause a piece of quantum hardware to implement:
a mode configured to:
stabilize an approximately degenerate ground state of a Hamiltonian in an oscillator mode for an energy gap protected qubit; and
a decay channel for the mode, wherein:
dissipation is permitted from the energy gap protected qubit via the decay channel at frequencies at which the system moves from a higher excited energy state to a lower energy state, wherein the lower energy state is a degenerate ground state manifold or an intermediate excited energy state; and
emission of photons is restricted from the energy gap protected qubit via the decay channel at a frequency of the degenerate ground state manifold.

* * * * *